Patented Oct. 1, 1946

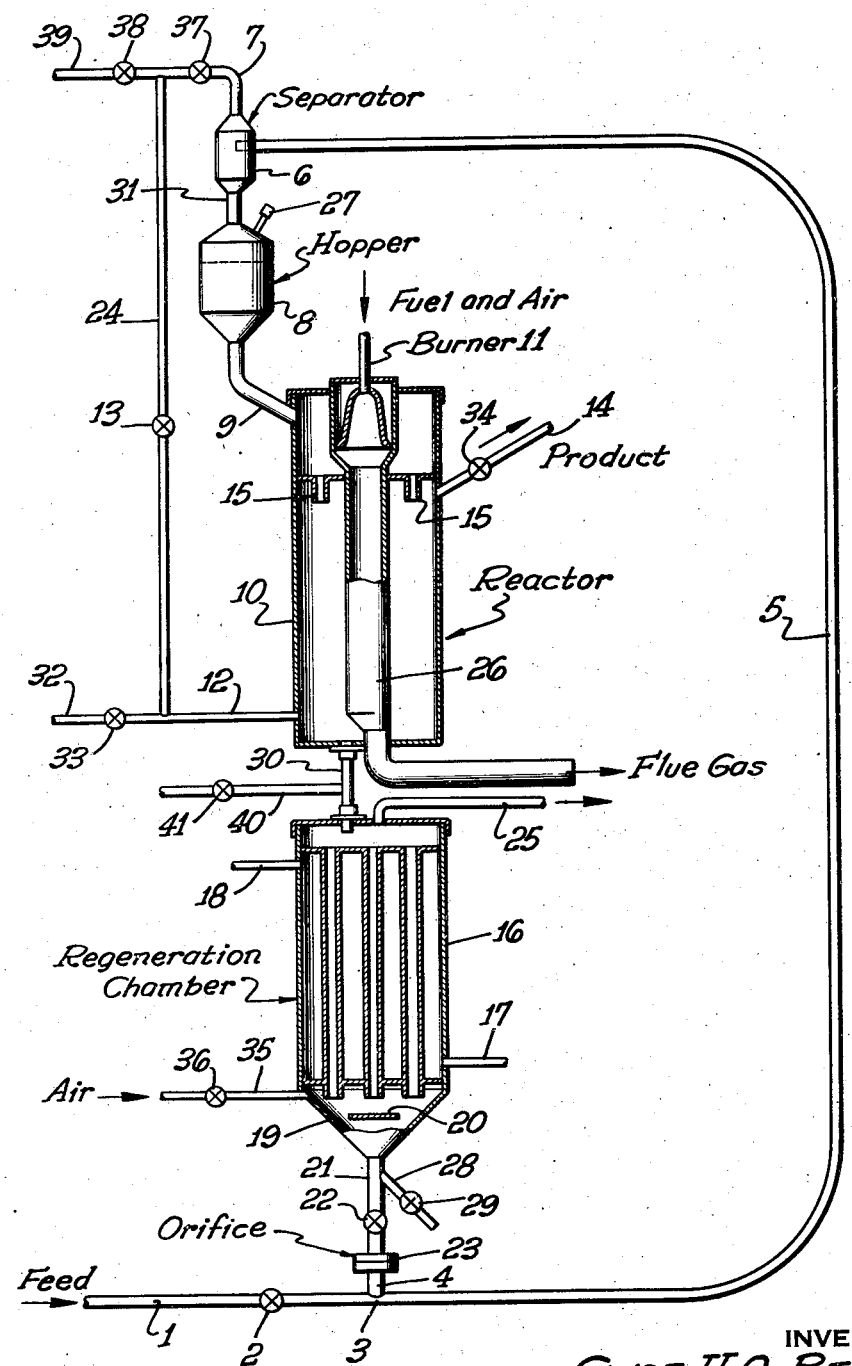

2,408,600

UNITED STATES PATENT OFFICE 2,408,600

CRACKING PROCESS

Clyde H. O. Berg, Long Beach, Calif., assignor to Union Oil Company of California, Los Angeles, Calif., a corporation of California Application September 22, 1943, Serial No. 503,345

7 Claims. (Cl. 196—52)

This invention relates to the catalytic conversion of hydrocarbons, and especially to the cracking of petroleum fractions in the presence of a moving stream of granular catalyst.

Catalytic cracking processes are known wherein the cracking is carried out in the presence of moving catalysts, and these processes are among the most efficient in use today. The known processes of this nature are of two different types, namely (1) the fluid type, and (2) the moving bed type. Each of these has its own advantages and disadvantages.

The fluid type process employs a powdered or dust-type catalyst which is blown through the reaction zone by a stream of feed vapors, and then is separated from the vaporous conversion products, and regenerated by being blown through a regeneration zone by a stream of air.

The moving bed type process employs a granular or bead type catalyst, which moves downward as a solid bed through a reaction zone through which a countercurrent stream of feed vapors is passed, and then is separated from the vaporous conversion products, mechanically conveyed to the top of a regeneration zone through which it moves downward in a solid bed through which air for regeneration is passed, the regenerated catalyst being separated and mechanically conveyed to the top of the reaction zone for reuse.

The fluid process has some advantages over the moving bed process in simplicity of construction of reactor and regenerator chambers, but has disadvantages in difficulty of separation of the catalyst from the gas streams, with attendant catalyst loss, and difficulty of control of regeneration temperatures. The moving bed process has the advantage over the fluid process in lower catalyst loss, more easily controllable regeneration temperatures and less difficult catalyst separation, but the two mechanical conveyor systems involved are very expensive to build and maintain and must be adjusted frequently to balance the reaction system against the regeneration system.

A process has now been discovered which has the advantages of both of the above systems without their disadvantages. Briefly the process involves movement of a granulated catalyst in a single continuous path, the catalyst being carried from the bottom to the top of its path by suspension in a flowing stream of gas, and thence after separation from the suspending gas, flowing downward in a continuous solid moving bed through zones of reaction and regeneration. One form of the process is illustrated in the attached figure, wherein a catalytic reactor is positioned above a catalyst regeneration chamber, and a continuous solid stream of granulated catalyst flows down through both chambers, the catalyst being carried back to the top of the reactor by suspension in a gaseous stream of vaporized feed.

Referring to the figure, vaporized and preheated hydrocarbon feed is introduced through line 1 and control valve 2. In mixing section 3 this feed gas is mixed with catalyst from line 4, and carries this catalyst in suspension upward through line 5 and into separator 6. Here the gas is separated from the catalyst and passes out through line 7. The catalyst drops through line 31 into hopper 8, and thence downward in a solid moving bed or stream through sealing leg 9 into reactor 10.

In reactor 10 the catalyst is heated by indirect heat exchange with hot combustion gases passing through tube 26 and obtained by burning fuel with air in burner 11. The hydrocarbon vapors from line 7 are introduced near the bottom of the reactor through lines 12 and 24 and valves 13 and 37, and are subjected to countercurrent contact with the flowing catalyst. The product vapors leave the top of the reactor through line 14 and valve 34, which are kept clear of catalyst by passing the catalyst down through tubes 15, which extend below outlet 14 and thus provide a disengaging space.

The used catalyst drops from the lower part of reactor 10 through sealing leg 30 into regeneration chamber 16 where it is regenerated by contact with air entering through line 35 and valve 36, and is cooled by indirect heat exchange with a cooling medium entering through line 17 and leaving through line 18. The regeneration flue gases leave through line 25, and the regenerated catalyst leaves the bottom of the chamber through conical section 19 containing baffle 20, drops through line 21 containing shut-off valve 22 and orifice 23 into line 4, and repeats its cycle. Catalyst may be withdrawn from the system through line 28 and valve 29 or added to the hopper 8 through line 27.

There are many advantages in the above described process over conventional processes. The equipment is simple to construct and operate. There are no complicated mechanical conveyor systems, and catalyst separation is simple and efficient with the preferred granular catalysts. There is no necessity for "balancing" of the flow of catalyst through the reactor against the flow through the regeneration chamber, since both flows are part of a single continuous cycle. Introducing hot feed into line 1 appears to give a desirable preliminary cracking in line 5.

Separator 6 may be a conventional cyclone separator, and the reactor, regeneration chamber and auxiliary equipment are of simple design and fabricated from common materials of construction. No baffles, packing, etc. are necessary in the main body of the hopper, reactor, or regeneration chamber, although they may be employed if desired. The regeneration chamber may be of multi-tube or multi-coil design with multiple air inlets and flue gas outlets to provide very close temperature control if desired. Similarly, the reactor may be equipped with multiple heaters, and multiple feed inlets and outlets if desired, to control contact time and temperature to provide either isothermal operation or operation with the desired temperature gradient. Multiple tubes may also be used in place of the single line 5 shown. Baffle 20 is merely a circular shield located centrally in conical section 19 to prevent the flow through the central portion of the regeneration chamber from exceeding materially the flow through the outer portion. If desired, any catalyst fines leaving with the gases in lines 7, 14 and 39 may be removed by Cyclones, Cottrell precipitators, settlers or the like. Any small loss of catalyst may be compensated for by the addition of new catalyst through line 27. The effectiveness of sealing legs such as lines 9, 30 and 21 may be improved by injecting a sealing gas such as steam, flue gas, carbon dioxide, nitrogen, and the like into the side of the lines at some point or points not too close to either end. This is illustrated in the figure by the addition of steam into line 30 through line 40 and valve 41.

In a second method of operation, hydrogen or a light hydrocarbon gas may be fed through line 1 to carry the catalyst through line 5, and the hydrocarbon feed may be introduced through valve 33 and lines 32 and 12. The gas leaving separator 6 may be withdrawn through lines 7 and 39 and valves 37 and 38, or part or all of it may be introduced into reactor 10 with the feed, through lines 7, 24 and 12, and valves 37 and 13. In this type of operation it may be most effective to add considerable heat to the gas during its passage through line 24, or to heat the mixture in line 12.

Although the above methods are preferred, a third method may be employed, wherein concurrent flow of feed vapors and catalyst is employed in reactor 10. This may be done by closing valves 34 and 37 and forcing the feed vapors entering line 1 to pass down through separator 6, hopper 8 and reactor 10, leaving through line 12. In this method it is not necessary that line 9 be a sealing leg. In fact hopper 8 may be incorporated as an integral part of reactor 10, with no intervening constriction.

The above processes may be employed for many types of hydrocarbon conversion, including cracking, polymerization, reforming and refining. By the term cracking it is intended to include processes wherein there is a scission of carbon-to-carbon bonds of the feed hydrocarbons, such as in conventional cracking of various petroleum fractions, as well as dealkylation, depolymerization, and like processes. By the term polymerization it is meant to include reactions involving increases in molecular weight, such as condensation and alkylation reactions, as well as polymerization of olefinic material. By the term reforming it is intended to include processes involving primarily a change in structure without substantial change in molecular weight, such as hydrogenation and dehydrogenation, aromatization, isomerization, and the like. By refining is meant the conversion of small amounts of undesirable hydrocarbons or contaminants to less objectionable forms, as in the polymerization of color and gum unstable olefins, diolefins, and the like, conversion of sulfur, oxygen, and nitrogen-containing contaminants in hydrocarbon stocks to easily removable forms such as $H_2S$, $H_2O$, $NH_3$ and the like.

The hydrocarbon feed stocks may be various petroleum fractions, such as natural or cracked gases, natural, crude or cracked gasolines, kerosenes, gas oils, lubricating oils, extracts, or other products obtained by conversion or extraction of such stocks; or similar fractions from coal tar, shale and the like. These may be converted by the appropriate treating processes of the previous paragraph to stable, high-octane gasolines, specific olefins, aromatics, naphthenes, or isoparaffins, or other desired products.

As examples of the above processes, a gas oil fraction from petroleum may be vaporized and heated to about 800° F., the vapors being introduced into line 1. These vapors pick up catalyst from line 4 and carry the catalyst upward to separator 6 from which the catalyst flows through the hopper, reactor, and regenerator as previously described. The feed vapors from separator 6 are introduced at the bottom of reactor 10 as indicated, being further preheated in line 24 if desired. An auxiliary gas such as hydrogen, a light hydrocarbon or an inert gas may be introduced into this stream through line 39 and valve 38, if desired, and this gas may be preheated to supply any additional heat desired. For example, a propane or butane or lighter fraction from the product may be preheated to 1100° F. and introduced into 39 so as to increase the temperature of the mixture in line 24 to 900° F. to 1000° F. The mixture may then be subjected to cracking in the presence of the catalyst in reactor 10 at substantially atmospheric pressure. The product may be withdrawn through line 14, and fractionally distilled to obtain a gas fraction, part of which is recycled through line 39, a gasoline of good antidetonation characteristics, a gas oil which may be vaporized and recycled to line 1, and a residuum suitable as fuel oil.

A gasoline or naphtha fraction may be reformed by a similar process. By operating at a pressure of 10 or more atmospheres and using hydrogen through line 39 rather than a light hydrocarbon, a product of higher aromatic hydrocarbon content and lower olefin content may usually be obtained.

In another mode of operation, flue gases at a temperature of 2000° F. to 4000° F. may be added through line 39 to give a preliminary thermal cracking at temperatures between about 1000° F. and 2000° F. to the hydrocarbons from line 7. Diluents such as inert gases, recycled fractions, etc., may be added through line 32 to control the temperature of the subsequent catalytic reaction in reactor 10.

The above operations may also be used for the dehydrogenation of butanes to butenes, and the further dehydrogenation to butadiene, in which processes it is advantageous to maintain a low total pressure such as atmospheric pressure, and to reduce the partial pressure of the hydrocarbon in the reaction chamber to a small fraction of one atmosphere, such as 0.1 atmosphere or less, by the introduction of inert gases such as flue gas, nitrogen, steam and the like, added through lines 1, 32, or 39.

Refining processes such as catalytic desulfurization or hydrogenation may readily be carried out according to the above methods, using hydrogen as the auxiliary gas. Refining of gasolines to remove unstable olefins and the like may also be carried on as above.

In all of the above methods in which an auxiliary gas is employed, these may be introduced into line 1 instead of feed stock vapors in order to carry the regenerated catalyst up through line 5, while the feed stock is introduced through line 32. It is also possible to employ the concurrent flow method described earlier, wherein sealing leg 9 is eliminated and the vapors in line 5 are forced down through the reactor. This method is particularly effective when treating a gasoline to polymerize unstable gum-forming olefins, since the polymers formed may condense and be swept out of the bottom of the reactor. In other operations, however, the countercurrent contacting is preferred.

As catalysts for the cracking and reforming operations alumina, silica-alumina combinations and group VI metal oxides such as chromium and molybdenum oxides, especially when employed with a support or carrier such as alumina or other metal oxide gel and the like, are suitable. For hydrogenation operations, oxides of metals having atomic numbers between 22 and 30 and especially cobalt, nickel and copper, and combinations of these with chromium, molybdenum, titanium, vanadium, and the like, as mixtures and as compounds such as chromites, molybdates, etc., are suitable. These may also be employed on carriers. For refining cracked gasolines, active clays, bauxite, magnesia, fuller's earth, and various oxide gels are suitable. These latter are also suitable carriers for the more active catalysts mentioned above. The invention is of course not limited to the use of the specific catalysts named.

The catalysts should be granular, preferably about 4 to 20 mesh in size, although sizes between about 1 and 60 mesh may be employed in many instances, and where special baffling is employed in the reactor and cooler to permit countercurrent flow of the gases without suspension of the catalyst therein, smaller sizes down to about 100 mesh may be employed.

The reaction is preferably carried out in the vapor phase, as indicated, although liquid phase operation may also be employed, such as by introducing a liquid feed through line 14, allowing it to flow down through the catalyst bed in reactor 10, and withdrawing the product through line 12. This would necessitate maintenance of a liquid level at or just above line 12, and provision of means such as a trap for preventing loss of liquid product through line 30.

The temperatures employed for cracking are generally high, in the range of about 800° F. to 2000° F. Many of the reforming operations such as dehydrogenation and aromatization also require high temperatures in this range, but isomerization and hydrogenation for example may be carried on at lower temperatures, down to about atmospheric. The pressures involved may range from about atmospheric up to 100 atmospheres or more, although for vapor phase operation pressures below about 20 atmospheres are preferable. Operation of both the reaction and regeneration processes at substantially the same pressure is preferred, but pressure differences up to 10 atmospheres or more may be tolerated by the use of properly designed sealing legs. As the pressure differential is increased, the efficiency of the sealing leg must be increased, as for example by lengthening the leg, or using more sealing gas.

The relative amounts of feed stock, auxiliary gas and catalyst employed will vary with the results desired. As an example however, applying to the aromatization of a crude gasoline fraction at 1000° F. and 10 atmospheres pressure, the feed may be introduced at a rate of 1 (liquid) volume per volume of catalyst (in reactor 10) per hour, hydrogen may be employed in a ratio of 3000 cubic feet per barrel of (liquid) feed, and the catalyst may be circulated at a rate of about 0.5 volume per hour. The catalyst flow rate is regulated largely by the size of the orifice 23. Feed, auxiliary gas, and catalyst flow rates between about one-tenth to ten times the above rates may be employed, and even wider limits may be used in some instances.

Outstanding features of the process of this invention as mentioned previously, are its simplicity and the use of a granular catalyst circulated by suspension in a flowing gaseous stream, followed by gravitational downward flow in a solid stream. No difficulty has been experienced in carrying granules of the above sizes up through line 5. For example, granules of 12 to 30 mesh have been lifted over 35 feet through a 1¼ inch pipe line at a rate of about 400 pounds per hour by a gas stream of about 70 pounds per hour.

In a variation of the process of this invention, the regeneration chamber 16 is placed above reactor 10, with sealing leg 39 between and sealing leg 21 below as usual. Non-combustible inert gas with or without some air may then be introduced into line 1, the obvious modifications in flow being employed.

In any of the above systems it is apparent that there are many variations which may be employed. For example the cooling fluid employed in regeneration chamber 16 may also be employed as a heating fluid in reaction chamber 10. This would necessarily involve a gaseous fluid, or possibly a system of flowing solids such as the catalyst flow system, but would preferably be a liquid such as a molten salt. When the cooling fluid is not also used in the reactor as a heating fluid, water or steam could be used as the cooling medium, or the feed stock, steam, or auxiliary gas employed could be preheated by using it as the cooling medium.

Although the process of this invention has been described primarily as a hydrocarbon conversion process, it may also be employed for shale oil eduction, oxidation, and like processes. For oxidation, oxygen may be substituted for at least a part of the auxiliary gas in the above systems. For shale oil eduction, fresh granulated shale is added through line 27. In hopper 8 it is diluted with a controlled amount of hot recycled spent shale from line 5 and separator 6, and passes into reactor 10 used as an eduction chamber. In reactor 10 it is heated, as by flue gases in tube 26, and subjected to stripping gas such as steam entering through line 12, the product leaving line 14. The stripping gas may also enter line 14, and the product leave through line 12 if desired to provide for simpler recovery of liquid products. The educted shale, which generally contains some carbonaceous residue even though educted at temperatures of 900° F. to 1500° F. is burned in chamber 16, the heat being absorbed by the stripping gas which enters through line 17, leaving line 18, and entering chamber 10 through line 12 or 14 as described. Part of this preheated stripping gas may also be charged into line 1 to carry the desired amount of recycled spent shale through line 5, or flue gases from line 26 may be used. The spent shale not recycled is withdrawn through line 28. Its heat content may be employed for steam generation or the like. The stripping gas may also be flue gas, nitrogen and the like although hydrogen and light hydrocarbons from the product leaving chamber 10 are preferred.

Other modifications of the processes of this invention which would occur to one skilled in the art are to be considered within the scope of this invention as defined in the following claims:

I claim:

1. A process for the catalytic conversion of hydrocarbons which comprises flowing a granulated catalyst downwardly by gravity through successive zones of reaction and regeneration, introducing hydrocarbons into said reaction zone and maintaining an elevated conversion temperature therein while said hydrocarbons flow through said reaction zone countercurrently to said flowing catalyst, regenerating said catalyst in said regeneration zone, withdrawing regenerated catalyst from said regeneration zone, suspending said withdrawn catalyst in a suspension gas to thereby lift said catalyst and pass it to a separating zone, separating said catalyst from said suspension gas in said separating zone, passing said separated catalyst to said reaction zone, and introducing said separated suspension gas into said reaction zone with said hydrocarbons.

2. A process according to claim 1 in which the suspension gas comprises hydrocarbon feed.

3. A process according to claim 1 in which the suspension gas comprises hydrogen.

4. A process according to claim 1 in which the suspension gas comprises light hydrocarbon gases.

5. A process for the catalytic conversion of hydrocarbons which comprises flowing granulated catalyst downwardly by gravity through successive zones of reaction and regeneration, maintaining an elevated conversion temperature in said reaction zone, regenerating said catalyst in said regeneration zone, withdrawing regenerated catalyst from said regeneration zone, suspending the withdrawn catalyst in a suspension gas comprising hydrocarbon feed to thereby lift said catalyst and pass it to a separating zone, separating said catalyst from said suspension gas in said separating zone, passing the separated catalyst to said reaction zone, adding to said separated suspension gas flue gases having a temperature between about 2000° F. and 4000° F. so as to give a preliminary thermal cracking to said hydrocarbon feed at a temperature between about 1000° F. and 2000° F., and passing the resulting gaseous mixture through said reaction zone countercurrently to said flowing catalyst.

6. A process according to claim 5 in which the catalyst granules are between about 4 and 20 mesh in size.

7. An apparatus for the catalytic conversion of hydrocarbons which comprises a reactor and a regeneration chamber so connected and arranged that granulated catalyst may flow by gravity successively through said reactor and regeneration chamber, means for introducing catalyst into said reactor, means for introducing a gaseous mixture into said reactor to pass countercurrently to said catalyst, means for maintaining an elevated temperature in said reactor, means for regenerating said catalyst in said regeneration chamber, means located near the bottom of said regeneration chamber for controlling the rate of flow of catalyst through said reactor and said regeneration chamber, outlet means for removing said catalyst from said regeneration chamber, separating means positioned above said reactor for separating gases from catalyst, means connecting said outlet means with said separating means, means for introducing a suspension gas into said connecting means to thereby suspend said catalyst in said suspension gas and lift said catalyst into said separating means, and means for introducing suspension gases separated in said separating means into said reactor together with said gaseous mixture.

CLYDE H. O. BERG.